(12) United States Patent
Barak et al.

(10) Patent No.: US 12,117,790 B2
(45) Date of Patent: Oct. 15, 2024

(54) METHOD AND A SYSTEM FOR SYNCHRONIZING A FIRST AND A SECOND SIMULATION SYSTEM

(71) Applicant: Siemens Industry Software Ltd., Tel Aviv (IL)

(72) Inventors: Guy Barak, Rishon le-Zion (IL); Moshe Hazan, Elad (IL); Werner Herla, Hoechstadt (DE); Gilad Milman, Hod Hasharon (IL); Johannes Ottermann, Amberg (DE); Gal Snir, Ramat Gan (IL); Robert Winter, Velburg (DE)

(73) Assignee: Siemens Industry Software Ltd., Tel Aviv (IL)

( * ) Notice: Subject to any disclaimer, the term of this patent is extended or adjusted under 35 U.S.C. 154(b) by 562 days.

(21) Appl. No.: 17/289,842

(22) PCT Filed: Oct. 29, 2018

(86) PCT No.: PCT/IB2018/001211
§ 371 (c)(1),
(2) Date: Apr. 29, 2021

(87) PCT Pub. No.: WO2020/089664
PCT Pub. Date: May 7, 2020

(65) Prior Publication Data
US 2022/0004159 A1 Jan. 6, 2022

(51) Int. Cl.
G05B 19/05 (2006.01)

(52) U.S. Cl.
CPC ......... *G05B 19/056* (2013.01); *G05B 19/052* (2013.01); *G05B 2219/13063* (2013.01);
(Continued)

(58) Field of Classification Search
None
See application file for complete search history.

(56) References Cited

U.S. PATENT DOCUMENTS

| 10,755,003 B2 | 8/2020 | Maturana et al. |
| 2009/0089029 A1 | 4/2009 | Sturrock et al. |

(Continued)

FOREIGN PATENT DOCUMENTS

| CN | 102867081 A | 1/2013 |
| CN | 104678778 A | 6/2015 |
| WO | 2018054465 A1 | 3/2018 |

OTHER PUBLICATIONS

Siemens, "Process Simulate Manufacturing process verification in powerful 3D environment", 2011, pp. 1-3 (Year: 2011).*

(Continued)

*Primary Examiner* — David Earl Ogg
(74) *Attorney, Agent, or Firm* — Laurence A. Greenberg; Werner H. Stemer; Ralph E. Locher (57) ABSTRACT

A method synchronizes first and second simulation systems, each operating in a free running operation thereby exchanging data to run the simulation systems. The method includes: a) providing the first simulation system (PLCSIM) being enabled to run in cycles at a linear speed determined by repeatably setting a scaling factor ($s_n$); b) providing the second simulation system (Process Simulate) to run in cycles at different speeds; c) the second simulation system requests at the end of a cycle a virtual time stamp from the first simulation system; d) calculating on the basis of the virtual time stamp a virtual duration time $\Delta t_{nfs}$ and on the basis of the virtual time stamp after completion of the cycle of the second simulation system a virtual duration time $\Delta t_{nss}$; and e) calculating an update sn+1 for the scaling factor according the most recent scaling factor $s_n$ multiplied by $\Delta t_{nss}/\Delta t_{nfs}$.

3 Claims, 3 Drawing Sheets

(52) U.S. Cl.
CPC .............. *G05B 2219/13174* (2013.01); *G05B 2219/15126* (2013.01)

(56) References Cited

U.S. PATENT DOCUMENTS

| | | | |
|---|---|---|---|
| 2009/0089030 A1* | 4/2009 | Sturrock ................ | G05B 17/02 703/7 |
| 2009/0187395 A1 | 7/2009 | Manohar et al. | |
| 2012/0101791 A1 | 4/2012 | Komatsu et al. | |
| 2013/0346046 A1* | 12/2013 | Rompaey ................ | G06F 30/20 703/6 |
| 2014/0214393 A1 | 7/2014 | Kim et al. | |
| 2016/0246278 A1* | 8/2016 | Tanide ................. | G05B 19/056 |
| 2018/0189431 A1* | 7/2018 | Adra ....................... | G06F 30/20 |

OTHER PUBLICATIONS

Siemens, "Getting started with S7-PLCSIM Advanced and simulation tables", Jul. 2018, pp. 13-26 (Year: 2018).*

Jin, Xing et al: "On Time Synchronization of Distributed Virtual Reality Simulation System", State Key Laboratory of Industrial Control Technology; published Aug. 31, 2008; pp. 1-3; vol. 37; No. 4; DOI:10.13976/j.cnki.xk.2008.04.006—English abstract.

* cited by examiner

METHOD AND A SYSTEM FOR SYNCHRONIZING A FIRST AND A SECOND SIMULATION SYSTEM

BACKGROUND OF THE INVENTION

Field of the Invention

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

In today's automation and engineering systems for designing and producing a product, the simulation of the design and manufacturing procedure can greatly contribute to the efficient design and production of the product. In particular under the brand of Siemens® a large number of software products are available to the markets which create during the complete life cycle of the product a digital twin of the product.

With respect to simulations systems, a broad variety of the industrial simulation systems is available. Some systems allow simulating the production process of the product, other simulate the product logic controller functionality during the production process. In particular, the simulations systems that simulate the production process of product, for example the casting of a metal piece or the like, usually simulate the evolution of the production process in the future. For example, they generate a video stream for the next 100 ms of the production process. These 100 ms are a time span on the virtual time scale. Nevertheless, the calculation for theses 100 ms may require on the real time scale more or less than 100 ms. With other words, this kind of simulation systems looks after each time slit of 100 ms on the virtual time scale how much time has effectively lapsed on the real-time scale. This results in the graph of the virtual time versus the real time in a step function.

On the other hand, a PLC simulation system (Programmable Logic Control System) runs at a linear step resulting in a linear bar in the graph virtual time versus real time.

The problem when executing two different simulations systems that exchange data in order to provide information to a graphical user interface lays in the missing synchronization since both simulations systems possess different virtual time systems. This may cause during the execution of the simulations systems some timeouts which yields partially jerky motion for the virtual production process of the products to be displayed.

In order to cope with this problem there are synchronization mechanism which involve both simulation systems regularly into a freeze state. In the freeze state the virtual time system and the execution of the simulation system is paused. During the freeze state, the faster simulation system can wait for the slower simulation system to catch up in terms of time. If one of those simulation systems is also visualizing components (like rendering objects) going into the freeze mode unfortunately causes the jerky motion of those components. For the user, it is hard to work with a simulation system that freezes frequently.

SUMMARY OF THE INVENTION

It is therefore the objective of the present invention to provide a method and a system for the synchronization of a first and a second simulation system which avoids the disadvantage of regular freeze states in order to synchronize the execution of two simulation systems.

This objective is achieved according to the present invention by a method for synchronizing a first and a second simulation system (PLCSIM, Process Simulate), each operating in a free running operation thereby exchanging data in order to run the simulation systems; said method comprising the steps of:
a) providing the first simulation system (PLCSIM) being enabled to run in operation cycles at a substantially linear speed wherein the speed is determined by setting a scaling factor ($s_n$) constant over at least one operation cycle;
b) providing the second simulation system (Process Simulate) being enabled to run in operation cycles wherein the speed within an operation cycle may vary from operation cycles to operation cycle;
c) executing the first and the second simulation system wherein the second simulation system requests at the end of an operation cycle a virtual time stamp from the first simulation system;
d) calculating on the basis of the requested virtual time stamp from the first simulation system a virtual duration time $\Delta t_{nfs}$ and on the basis of the virtual time stamp after completion of this operation cycle of the second simulation system a virtual duration time $\Delta t_{nss}$;
e) calculating an update $s_{n+1}$ for the scaling factor according the most recent scaling factor $s_n$ multiplied by $\Delta t_{nss}/\Delta t_{nfs}$; and
f) applying the updated scaling factor $s_{n+1}$ to determine the speed of the first simulation system over the course of the at least next operation cycle of the second simulation system.

Further, this objective is achieved according to the present invention by a system for synchronizing a first and a second simulation system (PLCSIM, Process Simulate), each operating in a free running operation thereby exchanging data in order to run the simulation systems; comprising:
a) the first simulation system (PLCSIM) being enabled to run in operation cycles at a substantially linear speed wherein the speed is determined by setting a scaling factor ($s_n$) constant over at least one operation cycle;
b) the second simulation system (Process Simulate) being enabled to run in operation cycles wherein the speed within an operation cycle may vary;
c) an execution engine for executing the first and the second simulation system wherein the second simulation system requests at the end of an operation cycle a virtual time stamp from the first simulation system;
d) an evaluation unit being enabled to calculate on the basis of the requested virtual time stamp from the first simulation system a virtual duration time $\Delta t_{nfs}$ and on the basis of the virtual time stamp after completion of this operation cycle of the second simulation system a virtual duration time $\Delta t_{nss}$;
e) the evaluation unit further being enabled to calculate an update $s_{n+1}$ for the scaling factor according the most recent scaling factor $s_n$ multiplied by $\Delta t_{nss}/\Delta t_{nfs}$; and f) the execution engine further being enabled to apply the updated scaling factor $s_{n+1}$ to determine the speed of the first simulation system over the course of the at least next operation cycle of the second simulation system.

PLCSIM are trademarked goods of Siemens Industry Software Inc., 5800 Granite Parkway, Suite 600, Plano, Texas 75024, US, and PROCESS SIMULATE are trademarked goods of Siemens Industry Software Ltd., 2, Negev Street, Airport City 7019900, Israel. PLCSIM stands for a PLC simulation system that runs in operation cycles at a substantially linear speed while PROCESS SIMULATE exemplarily stands for a simulation system being enabled to run in operation cycles wherein the speed within an operation cycle may vary from operation cycle to operation cycle.

Furthermore, this objective is achieved according to the present invention by a non-transitory computer readable medium encoded with executable instructions that when executed, cause at least one processor to carry out a method for synchronizing a first and a second simulation system according to the independent method claim.

These measures allow synchronizing two simulation systems along the execution of the simulation systems by adjusting the speed of the simulation system that is executed at a linear speed. Therefore, any mismatch in the timing of the two simulations systems is corrected over the course of an operation cycle of the simulations system that does not run at a constant speed within an operation cycle.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows.

Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION OF THE INVENTION

Various technologies that pertain to systems and methods that synchronize two simulations systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
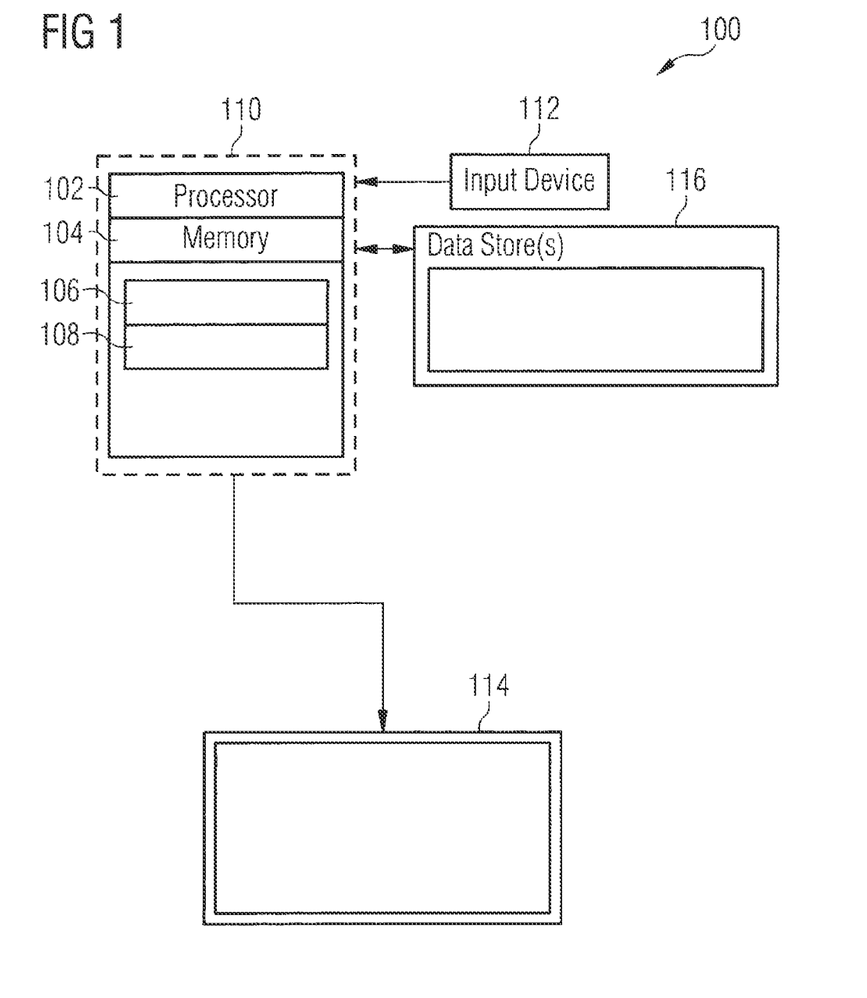
FIG. 1 illustrates a functional block diagram of an example system that facilitates the synchronization of two simulation systems.

With reference to FIG. 1, an example data processing system 100 is illustrated that facilitates carrying out one or more of the embodiments described herein. The system 100 may include a combination 110 of at least one processor 102 (e.g., a microprocessor/CPU) that is configured to carry out various processes and functions described herein by executing from a memory 104, a first simulation system 106 (executable instructions according to a software program) and a second simulation system 108 (executable instructions according to a software program) or portions thereof that are programmed to cause the at least one processor to carry out the various processes and functions described herein.

Such a memory 104 may correspond to an internal or external volatile memory (e.g., main memory, CPU cache, and/or RAM), that is included in the processor and/or in operative connection with the processor. Such a memory 104 may also correspond to a nonvolatile memory (e.g., flash memory, SSD, hard drive, or other storage device or non-transitory computer readable media) in operative connection with the processor.

The described data processing system 100 may include at least one input device 112 and at least one display device 114 in operative connection with the processor. The input device, for example, may include a mouse, keyboard, touch screen, or other type of input device capable of providing user inputs to the processor. The display device, for example, may include an LCD or AMOLED display screen, monitor, or any other type of display device capable of displaying outputs from the processor. For example, the processor 102, memory 104, software instructions 106, input device 112, and display device 114, may be included as part of a data processing system corresponding to a PC, workstation, server, notebook computer, tablet, mobile phone, or any other type of computing system, or any combination thereof.

The data processing system 100 may also include one or more data stores 116. The processor 102 may be configured to manage, retrieve, generate, use, revise, and store data and/or other information described herein from/in the data store 116. Examples of a data store may include a database (e.g., Oracle, Microsoft SQL Server), file system, hard drive, SSD, memory card and/or any other type of device or system that stores non-volatile data.

In example embodiments, the first and the second simulations system 106, 108 may include one or more PLM software applications that may be adapted to carry out one or more of the processes and functions described herein. PLM software may include computer-aided design (CAD), computer-aided manufacturing (CAM), and computer-aided engineering (CAE) software. The first simulation system 106 can be for example a virtual PLC system while the second simulation system 108 can be a process simulation system.

Examples of such PLM software applications may include the Teamcenter software, Tecnomatix Process Planner, Easy Plan produced by Siemens Product Lifecycle Management Software Inc., of Plano, Texas, US. However, it should be appreciated that the processes and functions described herein may be carried out using other product systems that manage, retrieve, generate, use, revise, simulate and/or store product data.

In an example embodiment, 3D models may include solid/surface models of objects corresponding to data that specifies mathematical representations of a 3D volume/surface of the objects. Such 3D model data may be drawn by a user using CAD software and/or may be accessed from the data store 116 and/or from files (e.g., in a CAD format such as JT or STEP, or other format for storing geometric curves that define the shape of the part). In addition, it should also be appreciated that the 3D model data may be generated from a 3D scan of an existing physical part.

Figure 2:
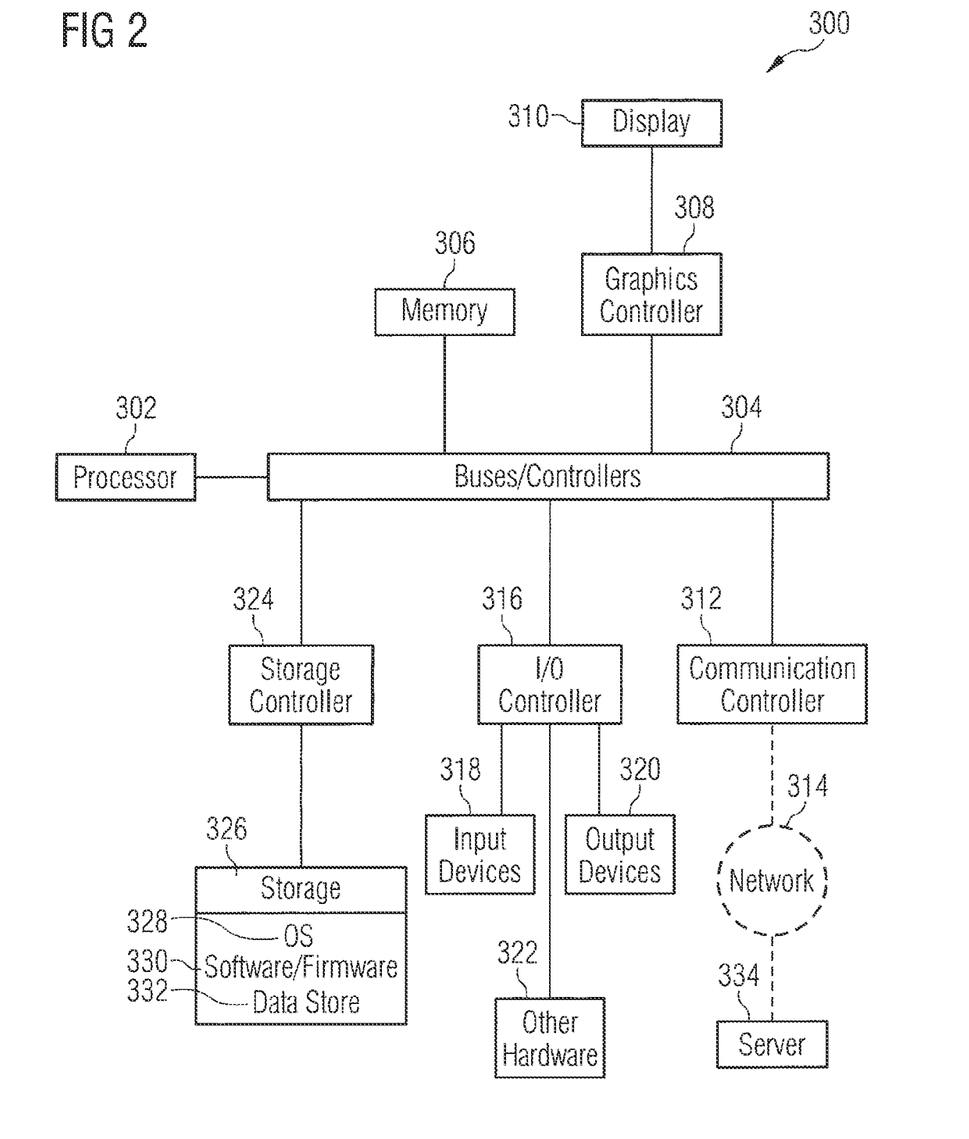
FIG. 2 illustrates a block diagram of a data processing system in which an embodiment may be implemented.

FIG. 2 illustrates a block diagram of a data processing system 300 (e.g., a computer system) in which an embodiment can be implemented, such as the previously described system 100, and/or other system operatively configured by computer/processor executable instructions, circuits, or otherwise to perform the functions and processes as described herein. The data processing system depicted includes at least one processor 302 (e.g., a CPU) that may be connected to one or more bridges/controllers/buses 304 (e.g., a north bridge, a south bridge).

One of the buses 304, for example, may include one or more I/O buses such as a PCI Express bus. Also connected to various buses in the depicted example may include a main memory 506 (RAM) and a graphics controller 308. The graphics controller 308 may be connected to one or more display devices 510 (e.g., LCD or AMOLED display screen, monitor, VR headset, and/or projector). It should also be noted that the processor 302 may include a CPU cache memory.

Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 312 (Ethernet controllers, WiFi controllers, cellular controllers) operative to connect to a local area network (LAN), Wide Area Network (WAN), a cellular network, and/or other wired or wireless networks 314 or communication equipment.

Further components connected to various busses may include one or more I/O controllers 316 such as USB controllers, Bluetooth controllers, and/or dedicated audio controllers (connected to speakers and/or microphones). It should also be appreciated that various peripherals may be connected to the I/O controller(s) (via various ports and connections) including input devices 318 (e.g., keyboard, mouse, pointer, touch screen, touch pad, drawing tablet, trackball, buttons, keypad, game controller, gamepad, camera, microphone, scanners, motion sensing devices that capture motion gestures), output devices 320 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 302 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 322 connected to the I/O controllers 516 may include any type of device, machine, or component that is configured to communicate with a data processing system.

Additional components connected to various busses may include one or more storage controllers 324 (e.g., SATA). A storage controller may be connected to a storage device 326 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 304 such as a PCI Express bus.

A data processing system in accordance with an embodiment of the present disclosure may include an operating system 328, software/firmware 330, and data stores 332 (that may be stored on a storage device 326 and/or the memory 306). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 312 may be connected to the network 314 (which may or may not be a part of a data processing system 300), which can be any local, wide area, remote, private, and/or public data processing system network or combination of networks, as known to those of skill in the art, including the Internet. Data processing system 300 can communicate over the network 314 with one or more other data processing systems such as a server 334 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 302 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 300 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Figure 3:
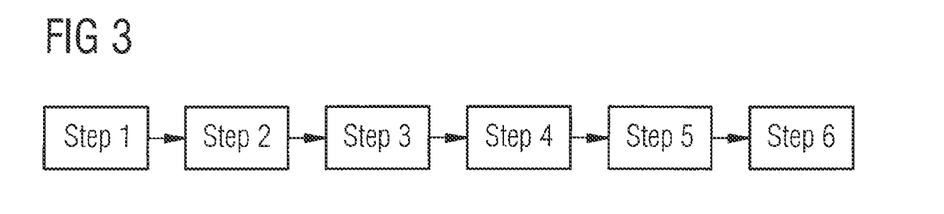
FIG. 3 illustrates a flow diagram of an example methodology that facilitates the synchronization of two simulation systems.

FIG. 3 now shows a workflow of the method for the synchronization of the two simulation systems 106 and 108. The first and the second simulation system (VPLC, Process Simulate) are operated in a free running mode. During this operation they exchange data in order to run the simulation systems and provide data to the display device 114. With respect to the method steps, step 1 provides the first simulation system 106 being enabled to run in operation cycles at a substantially linear speed wherein the speed is determined by setting a scaling factor ($s_n$) constant over at least one operation cycle of the first simulation system.

Step 2 provides the second simulation system 108 (here a 3D simulation tool) being enabled to run in operation cycles wherein the speed within an operation cycle may vary from operation cycle to operation cycle.

In step 3, the first and the second simulation system 106, 108 are executed wherein the second simulation system 108 requests at the end of an operation cycle a virtual time stamp from the first simulation system 106.

In step 4, on the basis of the requested virtual time stamp from the first simulation system a virtual duration time $\Delta t_{nfs}$ is calculated using the previous virtual time stamp from the first simulation system 106, too. On the basis of the virtual time stamp after completion of this operation cycle of the second simulation system 108 a virtual duration time $\Delta t_{nss}$ for this operation cycle is calculated, too.

In step 5, an update $s_{n+1}$ for the scaling factor is calculated using the most recent scaling factor $s_n$ multiplied by $\Delta t_{nss}/\Delta t_{nfs}$.

In step 6, this updated scaling factor $s_{n+1}$ is applied to determine the speed of the first simulation system 106 over the course of the next operation cycle of the second simulation system 108. This process is also demonstrated in FIG. 4 which shows a graph of the real time $t_r$ versus the virtual time $t_v$ behavior of the execution of the two simulation systems 106, 108. As mentioned earlier, the second simulation system 108 shows a step-function characteristic since after each time span of an operation cycle (for example 100 ms) on the virtual time scale, a shorter or a longer time can have lapsed on the real time scale. That causes the step function in FIG. 4 for the graph for the second simulation system 108 resulting in constant $\Delta y$ heigths of the steps but in different $\Delta x$ widths of the steps. In order to cope with this delay ($\Delta x > \Delta y$) or acceleration ($\Delta x < \Delta y$), the second simulation system 108 asks the first simulation system for a virtual time stamp after the execution of a cycle (for example 100 ms virtual time). If the virtual stamp of the first simulation system (106) is larger than the time stamp of the second simulation system (108) (first simulation system is ahead of the second simulation system 108), the scaling factor for the next cycle of the first simulation system 106 is reduced in order to allow the second simulation system to catch-up. If the virtual stamp of the first simulation system (106) is smaller than the time stamp of the second simulation system (108) (second simulation system 108 is ahead of the first simulation system 106), the scaling factor for the next cycle of the first simulation system 106 is increased in order to allow the first simulation system 106 to catch-up. Therefore, a permanent synchronization of the first and the second simulation system is achieved with a granularity of the virtual cycle time of the second simulation system (108).

Figure 4:
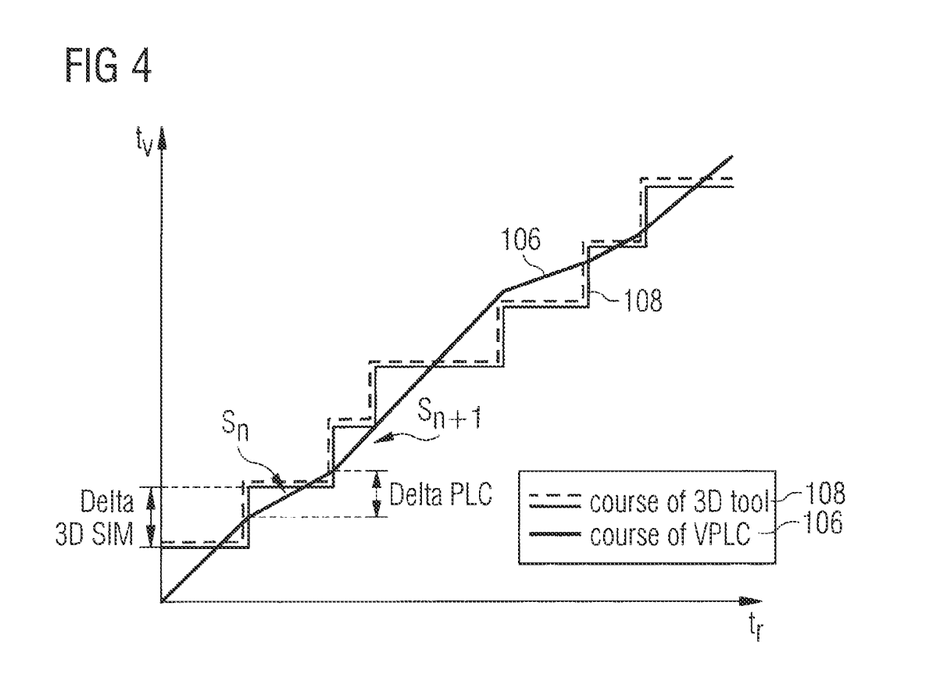
FIG. 4 illustrates a diagram indicating the effect of the method for the synchronization of the two simulation systems.

With other words, if for example the first simulation system 106 is ahead in time as compared to the second simulation system 108, the present method will slow down the first simulation system 106 since $s_{n+1}$ is smaller than $s_n$. On the other hand, if the first simulation system 106 is behind in time, the second simulation system 108 will speed up the first simulation system by the determination of $s_{n+1}$ being larger than $s_n$.

This method enables a synchronization of the two simulation systems 106, 108 without freezing the operation of the simulation systems. Jerky representations on the display device 114 are therefore eliminated.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 300 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims.

Moreover, none of these claims are intended to invoke a means plus function claim construction unless the exact words "means for" are followed by a participle.

The invention claimed is:

1. A method for synchronizing a first and a second simulation system, each operating in a free running operation thereby exchanging data to run the first and the second simulation system, which comprises steps of:
   a) providing the first simulation system being enabled to run in operation cycles at a linear speed, wherein the linear speed is determined by setting a scaling factor $S_n$ constant over at least one operation cycle, wherein $_n$ indicates an operation cycle counter;
   b) providing the second simulation system being enabled to run in operation cycles, wherein a speed within an operation cycle may vary;
   c) executing the first and the second simulation system, wherein the second simulation system requests at an end of the operation cycle a virtual time stamp from the first simulation system;
   d) calculating on a basis of the virtual time stamp from the first simulation system a virtual duration time $\Delta t_{nfs}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{fs}$ in $_{nfs}$ stands for the first simulation system, and the letters $_{ss}$ in $_{nss}$ stands for the second simulation system, therefore, $\Delta t_{nfs}$ stands for the virtual duration time of the n-th cycle of the first simulation system and $\Delta t_{nss}$ stands for the virtual duration time of the n-th cycle of the second simulation system;
   e) calculating an updated scaling factor $S_{N+1}$ for the scaling factor according to a most recent said scaling factor Sn multiplied by $\Delta t_{nss}/\Delta t_{nfs}$; and
   f) applying the updated scaling factor $S_{n+1}$ to determine the linear speed of the first simulation system over a course of at least a next operation cycle of the second simulation system.

2. A system for synchronizing a first and a second simulation system, each operating in a free running operation thereby exchanging data to run the first and the second simulation system, the system comprising:
   a) the first simulation system being enabled to run in operation cycles at a linear speed, wherein the linear speed is determined by setting a scaling factor ($S_n$) constant over at least one operation cycle, wherein $_n$ indicates an operation cycle counter;
   b) the second simulation system being enabled to run in operation cycles wherein a speed within an operation cycle may vary;
   c) an execution engine for executing the first and the second simulation system, wherein the second simulation system requests at an end of the operation cycle a virtual time stamp from the first simulation system;
   d) an evaluation unit enabled to calculate on a basis of the virtual time stamp requested from the first simulation system a virtual duration time $\Delta t_{nfs}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{ts}$ in $_{nfs}$ stands for the first simulation system, and the letters $_{ss}$ in $_{nss}$ stands for the second simulation system, therefore, $\Delta t_{nts}$ stands for the virtual duration time of the n-th cycle of the first simulation system and $\Delta t_{nss}$ stands for the virtual duration time of the n-th cycle of the second simulation system;

e) said evaluation unit further being enabled to calculate an updated scaling factor Sn+1 for the scaling factor according to a most recent said scaling factor Sn multiplied by $\Delta t_{ndd}/\Delta t_{nts}$; and f) said execution engine further being enabled to apply the updated scaling factor Sn+1 to determine the linear speed of the first simulation system over a course of at least a next operation cycle of the second simulation system.

3. A non-transitory computer readable medium encoded with executable instructions that when executed on at least one processor, cause said at least one processor to carry out a method for synchronizing a first and a second simulation system, each operating in a free running operation thereby exchanging data to run the first and the second simulation system, which comprises steps of:

a) providing the first simulation system being enabled to run in operation cycles at a linear speed, wherein the linear speed is determined by setting a scaling factor $S_n$ constant over at least one operation cycle, wherein $_n$ indicates an operation cycle counter;

b) providing the second simulation system being enabled to run in operation cycles, wherein a speed within an operation cycle may vary;

c) executing the first and the second simulation system, wherein the second simulation system requests at an end of the operation cycle a virtual time stamp from the first simulation system;

d) calculating on a basis of the virtual time stamp from the first simulation system a virtual duration time $\Delta t_{nts}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{ts}$ in $_{nfs}$ stands for the first simulation system, and the letters $_{ss}$ in $_{nss}$ stands for the second simulation system, therefore, $\Delta t_{nts}$ stands for the virtual duration time of the n-th cycle of the first simulation system and $\Delta t_{nss}$ stands for the virtual duration time of the n-th cycle of the second simulation system;

e) calculating an updated scaling factor Sn+1 for the scaling factor according to a most recent said scaling factor Sn multiplied by $\Delta t_{nss}/\Delta t_{nts}$; and f) applying the updated scaling factor $S_{n+1}$ to determine the linear speed of the first simulation system over a course of at least a next operation cycle of the second simulation system.

* * * * *

UNITED STATES PATENT AND TRADEMARK OFFICE
CERTIFICATE OF CORRECTION

PATENT NO. : 12,117,790 B2
APPLICATION NO. : 17/289842
DATED : October 15, 2024
INVENTOR(S) : Guy Barak et al.

It is certified that error appears in the above-identified patent and that said Letters Patent is hereby corrected as shown below:

In the Claims

Claim 1, Column 10, Lines 26-41 should read as follows:
d) calculating on a basis of the virtual time stamp from the
first simulation system a virtual duration time $\Delta t_{nfs}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{fs}$ in $_{nfs}$ stands for the first simulation system, and the letters $_{ss}$ in $_{nss}$ stands for the second simulation system, therefore, $\Delta t_{nfs}$ stands for the virtual duration time of the n-th cycle of the first simulation system and $\Delta t_{nss}$ stands for the virtual duration time of the n-th cycle of the second simulation system;
e) calculating an updated scaling factor $S_{n+1}$ for the
scaling factor according to a most recent said scaling factor $S_n$ multiplied by $\Delta t_{nss}/\Delta t_{nfs}$; and Claim 2, Column 10, Lines 62-67 - Column 11, Lines 1-12 should read as follows:
d) an evaluation unit enabled to calculate on a basis of the
virtual time stamp requested from the first simulation system a virtual duration time $\Delta t_{nfs}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{ss}$ and $_{nfs}$ stands for the first simulation system, and the letters $_{ss}$ in $_{nss}$ Signed and Sealed this
Thirty-first Day of December, 2024

Derrick Brent
*Acting Director of the United States Patent and Trademark Office*

CERTIFICATE OF CORRECTION (continued)
U.S. Pat. No. 12,117,790 B2 stands for the second simulation system, therefore, $\Delta t_{nfs}$ stands for the virtual duration time of the n-th cycle of the first simulation system and $\Delta t_{nss}$ stands for the virtual duration time of the n-th cycle of the second simulation system;

e) said evaluation unit further being enabled to calculate an updated scaling factor $S_{n+1}$ for the scaling factor according to a most recent said scaling factor $S_n$ multiplied by $\Delta t_{nss}/\Delta t_{nfs}$; and Claim 3, Column 12, Lines 8-23 should read as follows:

d) calculating on a basis of the virtual time stamp from the first simulation system a virtual duration time $\Delta t_{nfs}$ and on a basis of the virtual time stamp after completion of the operation cycle of the second simulation system a virtual duration time $\Delta t_{nss}$, wherein in said terms $_{nfs}$ and $_{nss}$, the letter $_n$ stands for an n-th cycle of an operation of the first and the second simulation systems, the letters $_{fs}$ in $_{nfs}$ stands for the first simulation system, and the letters $_{ss}$ in $_{nss}$ stands for the second simulation system, therefore, $\Delta t_{nfs}$ stands for the virtual duration time of the n-th cycle of the first simulation system and $\Delta t_{nss}$ stands for the virtual duration time of the n-th cycle of the second simulation system;

e) calculating an updated scaling factor $S_{n+1}$ for the scaling factor according to a most recent said scaling factor $S_n$ multiplied by $\Delta t_{nss}/\Delta t_{nfs}$; and